(12) United States Patent
Montagnoni et al.

(10) Patent No.: US 8,763,227 B2
(45) Date of Patent: Jul. 1, 2014

(54) DEVICE FOR ASSEMBLING AND DISASSEMBLING A SENSOR IN A BEARING UNIT

(75) Inventors: Raffaele Montagnoni, Pinerolo (IT); Andrea Serafini, Pinerolo (IT)

(73) Assignee: Aktiebolaget SKF, Gothenburg (SE)

( * ) Notice: Subject to any disclaimer, the term of this patent is extended or adjusted under 35 U.S.C. 154(b) by 1271 days.

(21) Appl. No.: 11/913,407

(22) PCT Filed: May 15, 2006

(86) PCT No.: PCT/EP2006/062306
§ 371 (c)(1),
(2), (4) Date: Nov. 1, 2007

(87) PCT Pub. No.: WO2006/122915
PCT Pub. Date: Nov. 23, 2006

(65) Prior Publication Data
US 2008/0178448 A1    Jul. 31, 2008

(30) Foreign Application Priority Data

May 16, 2005  (IT) .............................. TO20050062 U

(51) Int. Cl.
*B23Q 3/00* (2006.01)
(52) U.S. Cl.
USPC ............................................ 29/283; 29/271
(58) Field of Classification Search
USPC .......................................... 29/283, 271, 270
See application file for complete search history.

(56) References Cited

U.S. PATENT DOCUMENTS

| 6,037,766 | A | 3/2000 | Goossens et al. |
| 6,415,491 | B1* | 7/2002 | Klann .............................. 29/259 |
| 6,601,443 | B1* | 8/2003 | Stumpe et al. ............. 73/117.02 |
| 6,629,343 | B1* | 10/2003 | Chesney et al. .............. 29/25.35 |
| 7,380,324 | B2* | 6/2008 | Young .............................. 29/259 |
| 2002/0181815 | A1* | 12/2002 | Beauprez ...................... 384/448 |
| 2004/0126043 | A1 | 7/2004 | Ito |
| 2005/0185868 | A1* | 8/2005 | Iiya et al. ...................... 384/448 |
| 2008/0178448 | A1* | 7/2008 | Montagnoni et al. ........... 29/283 |

FOREIGN PATENT DOCUMENTS

JP      2004211841      7/2004

* cited by examiner

*Primary Examiner* — Lee D Wilson
(74) *Attorney, Agent, or Firm* — Merchant & Gould P.C.

(57) ABSTRACT

A rotation sensor (19) is used for detecting relative rotation between a rotatable member (11, 12) and a non-rotatable member (10) of a bearing unit. The sensor (19) is retained in a sensor carrier body (18) of plastic material and annular shape. An annular supporting insert (17) serves to mount the sensor carrier body (18) onto the non-rotatable member (10) with the sensor operatively facing an impulse ring (15) secured to a rotatable member (12) of the unit. The sensor carrier body (18) and the supporting insert (17) provide a lock and seats (18a, 18c, 18d, 18m, 18n; 17c, 17d, 17m, 17n) for releasably locking the sensor carrier body (18) to the supporting insert (17).

12 Claims, 7 Drawing Sheets

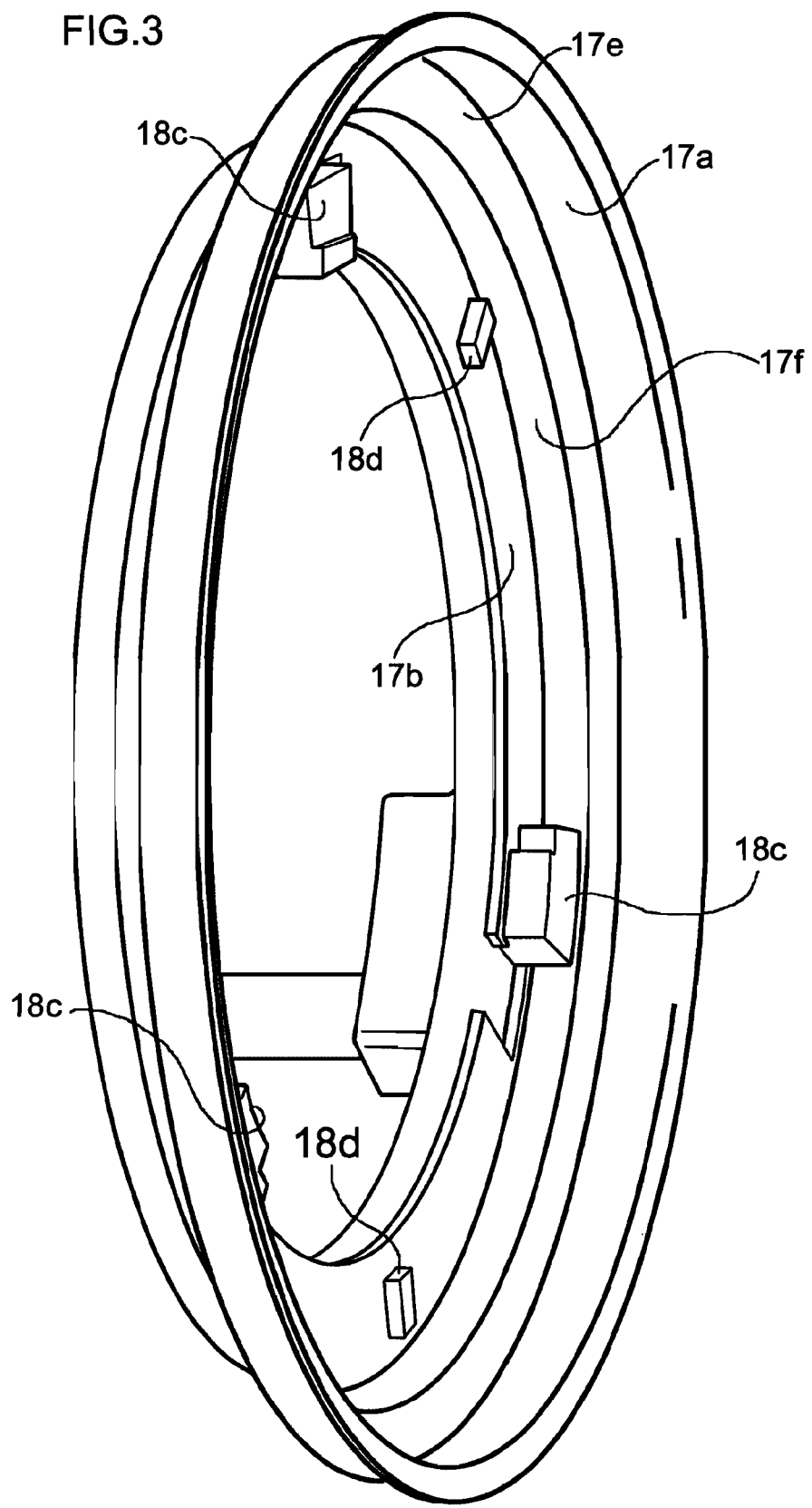

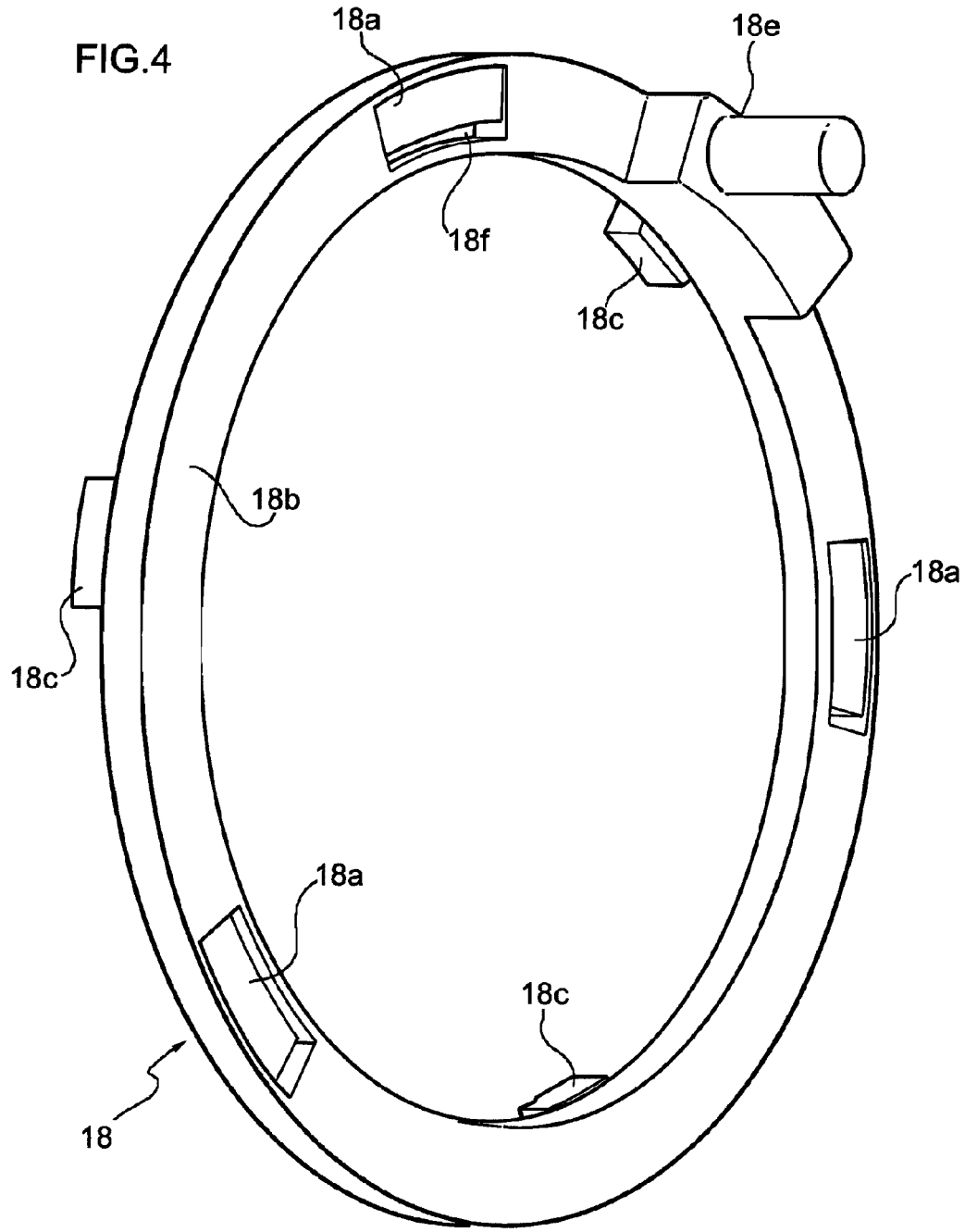

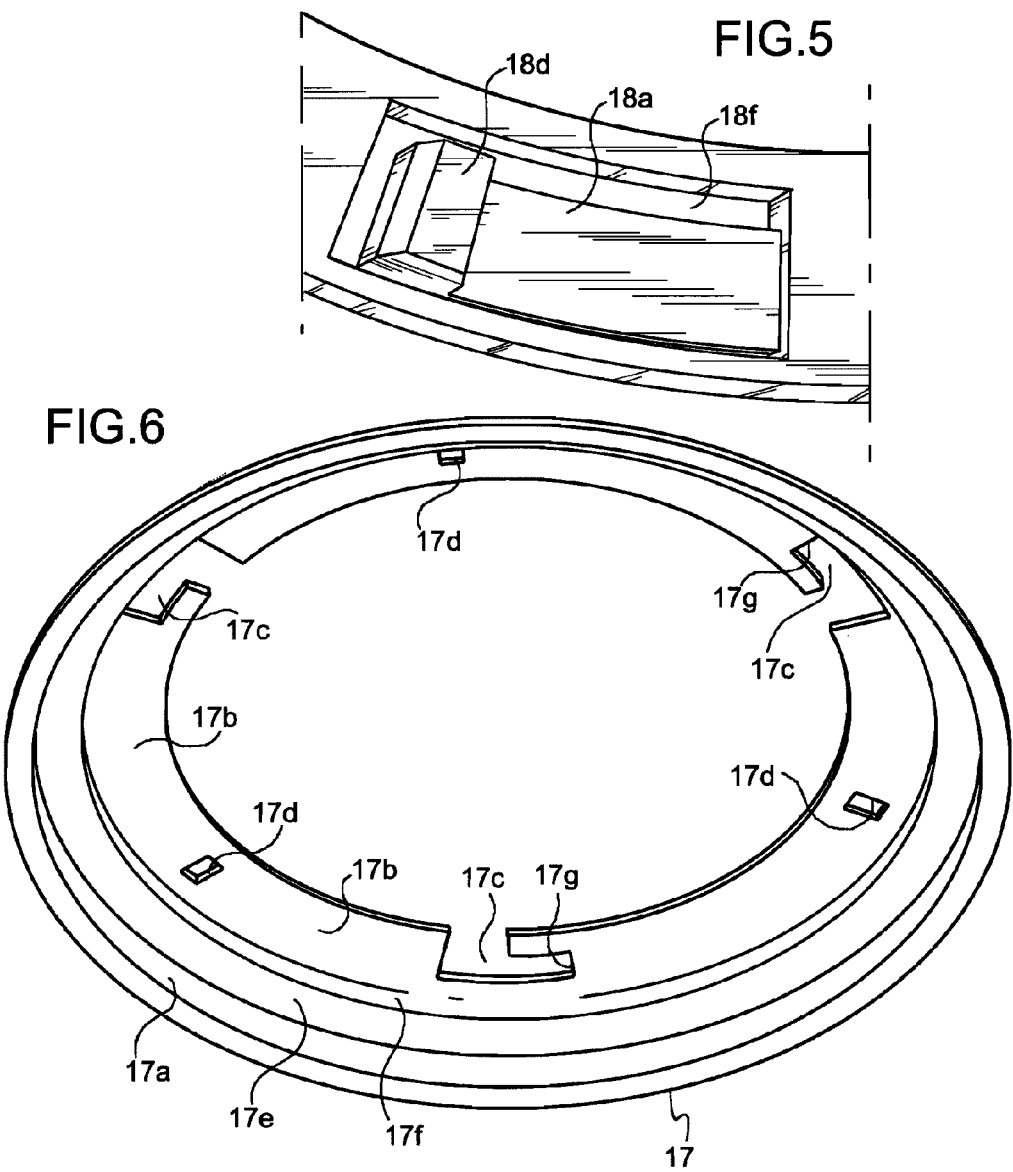

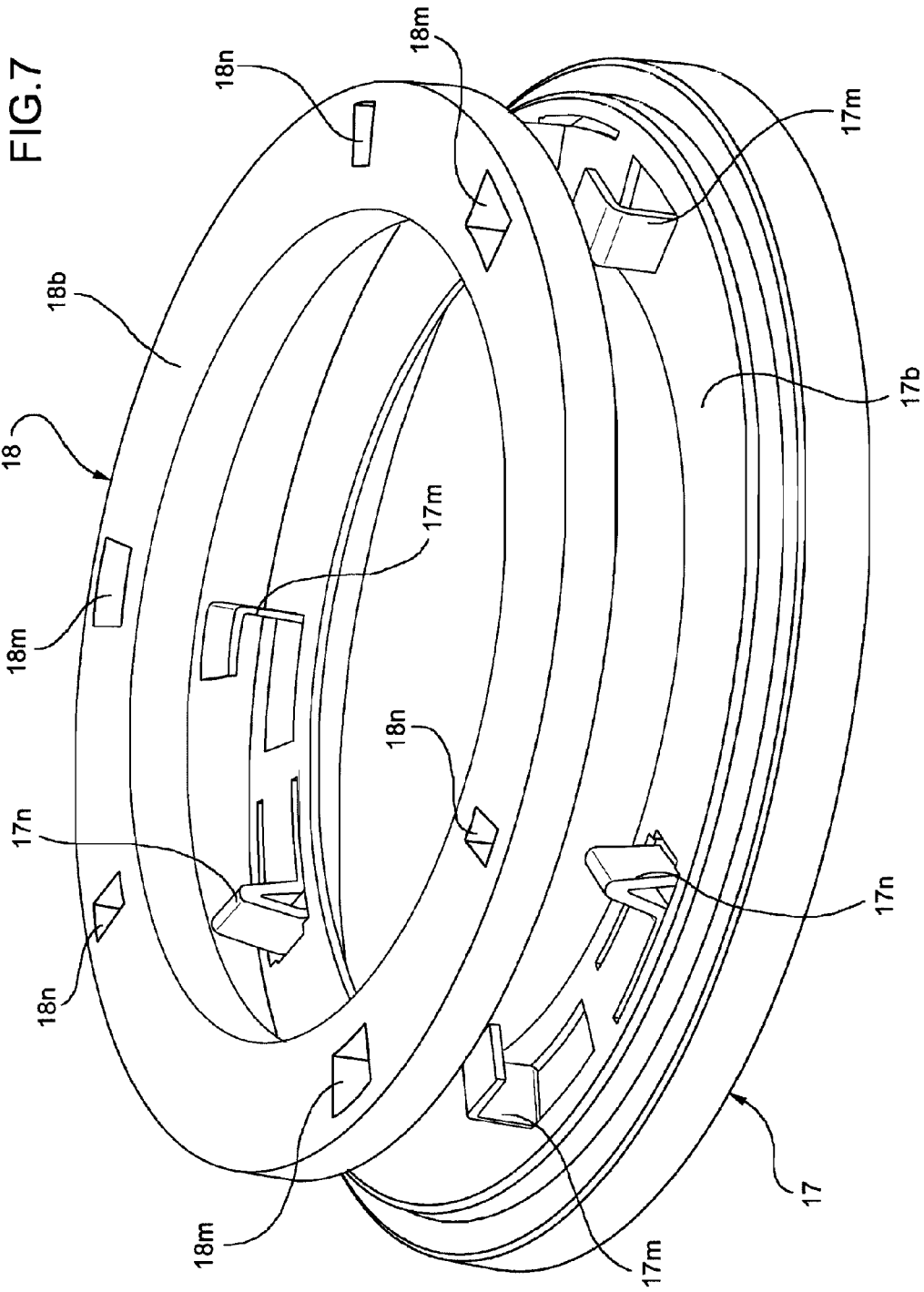

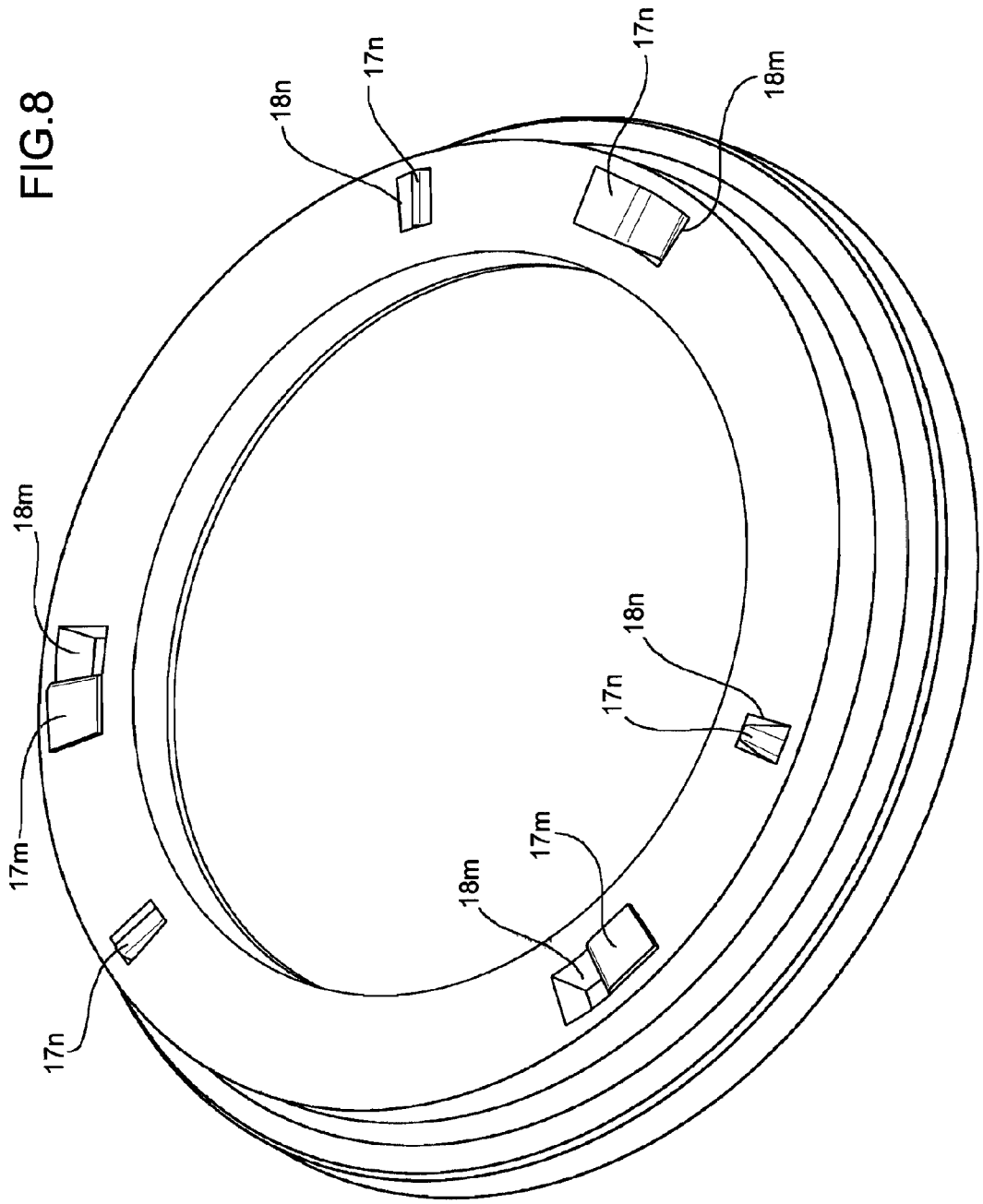

_US 8,763,227 B2_

DEVICE FOR ASSEMBLING AND DISASSEMBLING A SENSOR IN A BEARING UNIT

BACKGROUND OF THE INVENTION

The present invention refers to a device for assembling and disassembling a sensor in bearing unit, particularly a rotation sensor in a bearing unit or a hub-bearing unit of a motor vehicle wheel.

Conventionally, in order to detect relative rotation between the rotating race and the stationary race of a unit of the above-mentioned type, detecting devices are used comprising an impulse ring mounted onto a rotating part of the unit, and a sensor that is fitted to a stationary part in a position facing the impulse ring at a preset distance. Electric signals generated by the sensor owing to the rotation of the impulse ring are transmitted to a processing unit mounted on board of the vehicle, which provides information on the speed of the wheels.

With most arrangements used to date, the sensor is incorporated in an annular body of plastic material over-moulded on an annular insert that is forcefully mounted on a surface of the non-rotating race of the hub-bearing unit.

This arrangement involves a practical drawback. When it is necessary to replace or service the sensor, the metallic insert has to be disassembled from the non-rotating race of the bearing, which is not easy owing to the afore-mentioned forced coupling. In some instances, removal of the metal insert is so difficult that one prefers to replace the whole bearing.

SUMMARY OF THE INVENTION

The object of the present invention is to improve assembling and especially the disassembling of a sensor from a bearing unit or a hub-bearing unit, in order to overcome the above-discussed drawback.

This and other objects and advantages, that will be better understood herein after, are accomplished in accordance with the present invention by an assembling device having the features defined in the appended claims.

BRIEF DESCRIPTION OF THE DRAWINGS

A few preferred but non limiting embodiments of an assembling device according to the invention will now be described, reference being made to the attached drawings, in which:

FIGS. 2 and 3 are perspective views showing two opposite sides of an assembling device according to a first embodiment of the invention;

FIG. 4 is a perspective view of a sensor carrier body which is a part of the device of FIGS. 2 and 3;

FIG. 5 is an enlarged perspective view of a detail of the sensor carrier body of FIG. 4;

FIG. 6 is a perspective view of an annular insert for supporting the sensor carrier body of FIG. 4; and FIGS. 7 and 8 are perspective views of a sensor carrier body and a supporting insert according to a second embodiment of the invention.

DETAILED DESCRIPTION OF THE PREFERRED EMBODIMENT(S)

Figure 1:
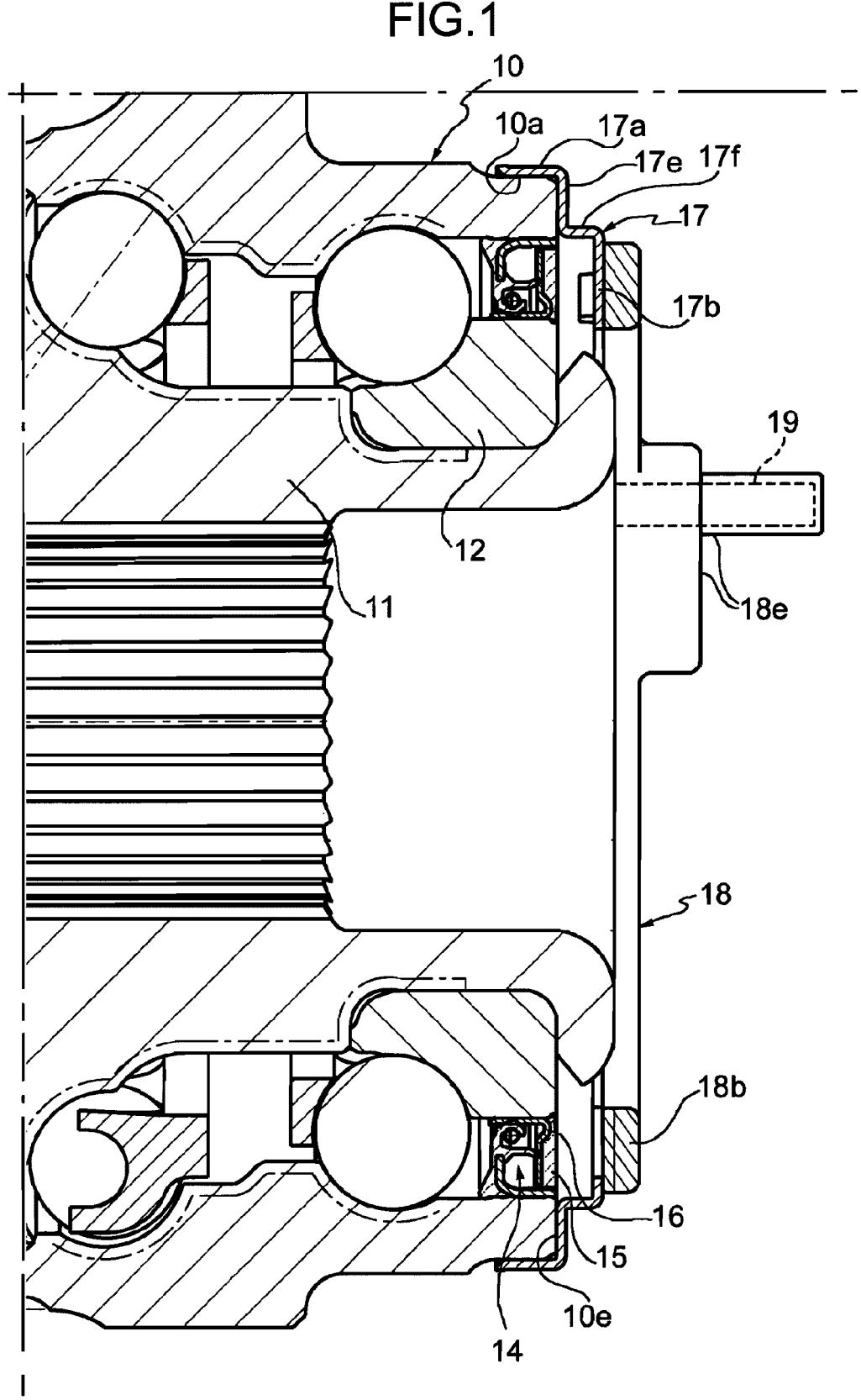
FIG. 1 is an axial sectional view of a hub-bearing unit for a driving wheel of a motor vehicle equipped with a device according to the present invention.
Figure 2:
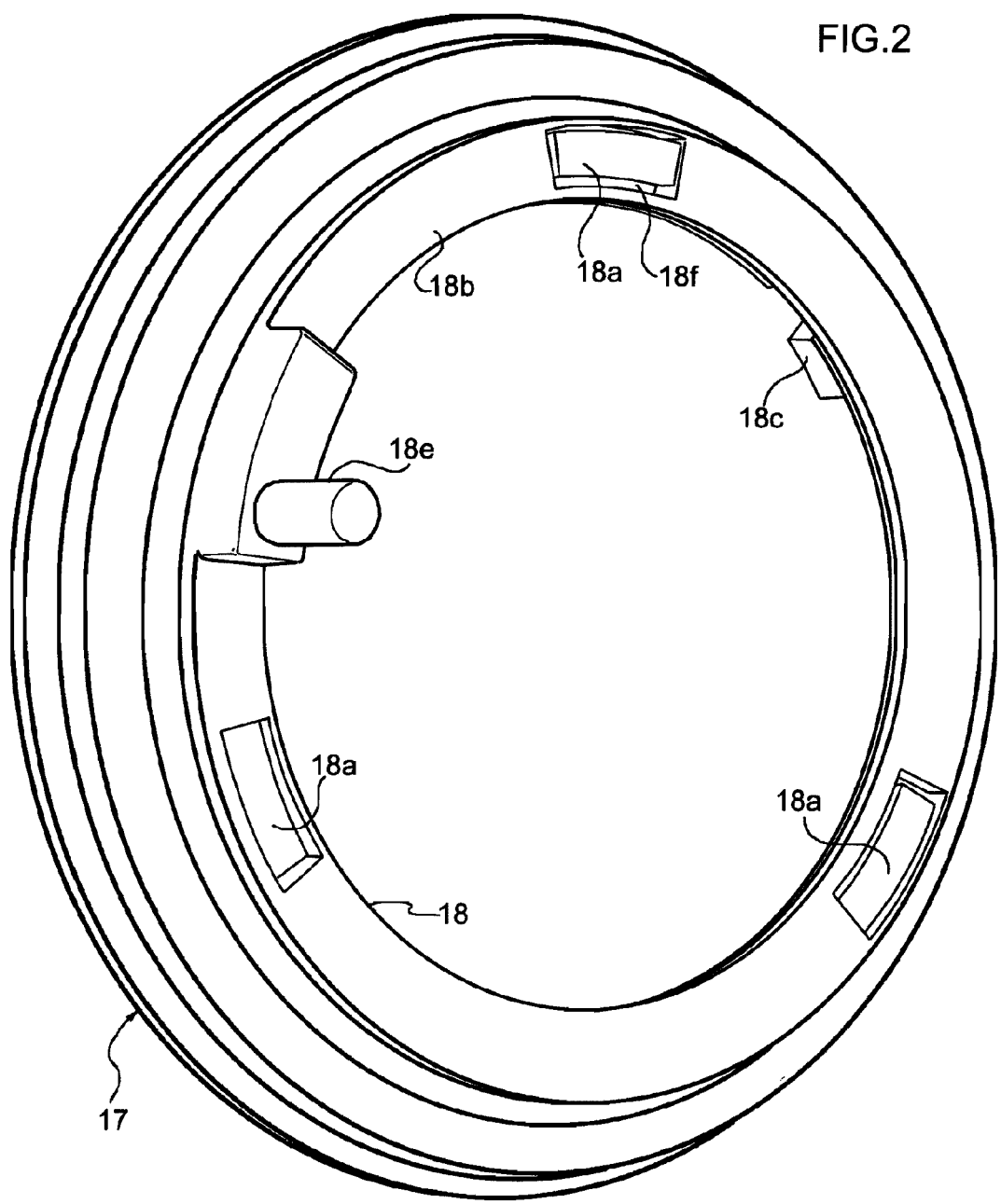

Referring initially to FIG. 1, a hub-bearing unit for a driving wheel of a motor vehicle comprises a radially outer stationary race 10, fixable to a suspension standard (not shown) of the vehicle, a radially inner rotatable hub 11 fixable to a wheel (not shown), and two rows of rolling bodies, in this example balls 13, interposed between the outer race 10, the hub 11, and a bearing race 12 rigidly fixed onto the hub. Designated 14 is a sealing device, of conventional design, mounted on the axially inner side (or inboard side) of the bearing unit, i.e. the side facing the inside of the vehicle. Integrated in the sealing device 14 is a magnetized impulse ring 15 fixed to an annular insert 16 mounted on the rotatable race 12 of the hub-bearing unit.

A detecting sensor, indicated schematically at 19, is mounted on the outer stationary race 10, operatively facing the impulse ring 15 in an axial direction, by means of an annular insert 17 made of metal sheet and coupled to an annular body 18 of plastic material which incorporates the sensor 19.

In this context, the sensor 19 is a rotation sensor. However, reference to this possible field of use should not be interpreted as in any way limiting of the scope of the patent. From the ensuing description, those skilled in the art will promptly recognize that the features of annular elements 17 and 18 are equally suited also for other kinds of sensors, for example linear or angular displacement sensors, temperature sensors, vibration sensors, load sensors, etc.

The metal insert 17 and the plastic annular body or sensor carrier 18 are mutually lockable with one another axially and rotationally by means of a bayonet joint and a snap-action quick mounting, as described herein after.

At a radially outer position, the metal insert 17 has an axial cylindrical edge 17a that is forcefully fitted onto an outer cylindrical surface 10a of the outer race 10 of the hub-bearing unit. At a radially inner position, as better shown in FIG. 6, the metal insert 17 has a radial flange 17b where a number of recesses 17c (in this example three recesses 17c) provide for a bayonet coupling with corresponding bayonet projections 18d protruding from the annular sensor carrier body 18. Formed in the flange 17b are also three recesses or openings 17d for cooperating with three corresponding projections 18c carried by elastically flexible tabs 18a of the sensor carrier 18 for snap-coupling rotationally the insert 17 to the sensor carrier 18. The axial edge 17a is joined to the radial flange 17b by a radial wall 17e adapted for abutting against a side 10e of the outer race 10, and by a cylindrical wall 17f that serves to space apart axially the flange 17b and therefore the sensor body 18 from the impulse ring 15 (FIG. 1).

In a preferred embodiment, formed through the wall 17f is a number of passages or radial through bores 17h circumferentially spaced apart (FIGS. 1, 3 and 6), in order to allow the outflow of water which may have seeped into the chamber defined between the annular bodies 17, 18 and the axially inner side of the hub-bearing unit. To this end, i.e. to allow water to exit by gravity, at least one of the passages 17h is located in a low position when the device is mounted on the hub-bearing unit.

The sensor carrier 18 forms, as a single piece (FIG. 4), an annular disk 18b, a casing 18e axially projecting from the axially inner side of the annular disc 18b and, on the axially inner side of the annular disc 18b, the said projections 18c, 18d. The casing 18e serves to retain and protect the rotation sensor 19 (and possibly also other electric or electronic devices for processing signals generated by the sensor) in a position operatively facing the impulse ring 15. The bayonet projections 18c are L-shaped to allows them to be partially inserted into the recesses 17c and axially lock the sensor carrier body 18 to the insert 17 through a mutual rotation movement, until the projections 18 and the ends 17g (FIG. 6)

of the recesses 17c come into abutment. Upon reaching this position, the axial projections 18d carried by the respective elastically flexible tabs 18a, snap-engage into the corresponding openings 17d. The sensor carrier 18 is so locked also rotationally to the insert 17.

The sensor carrier body 18 can be released from its supporting insert 17 and so disassembled from the unit in a particularly easy and effective way owing to the fact that the rotational locking projections 18d are easy to access. As a matter of fact, the flexible tabs 18a are formed within respective through apertures or windows 18f of the annular disc 18b (FIG. 5). When one has to replace or check correct operation of the sensor, a sharp tool (such as a screw driver) can be inserted through the windows 18f to move the tabs 18a so as to disengage the projections 18d from the recesses 17d. The sensor carrier body can so be rotated to disengage the bayonet coupling.

FIGS. 7 and 8 show another embodiment of the invention, where the sensor carrier body 18 forms a first set of through openings 18m and a second set of through openings 18n (the projecting casing 18e for the sensor is not shown in FIGS. 7 and 8).

The metal sheet insert 17 forms a first set of L-shaped rigid tabs 17m axially protruding from the flange 17b for fitting into the openings 18m of the sensor body carrier 18 and ensure mutual axial locking of elements 17 and 18 according to a bayonet joint (FIG. 8). The metal insert 17 further forms a second set of elastically flexible tabs 17n for snap-fitting into the openings 18n of the sensor carrier body 18 so as to keep the elements 17 and 18 rotationally locked. The sensor carrier body 18 can be released from the supporting insert 17 by pressing the elastic tabs 17n so as to disengage them from the seats 18n.

The invention is not intended to be limited to the embodiments described and illustrated herein, which should be considered as examples of the assembling device. Rather, the invention may be modified with regard to the shape and arrangement of parts and to constructional and functional details, as will be apparent to those killed in the art. For example, the number and location of recesses 17c, 17d and the respective projections 18c, 18d may be modified with respect to what is shown. However, it is preferable that the bayonet coupling means and the snap-locking means be angularly equally spaced by a same angle (that is 120° in this example).

The invention claimed is:

1. A device for assembling a sensor to a non-rotatable member of a bearing unit of a motor vehicle wheel, comprising:
   a substantially annular plastic sensor carrier body retaining said sensor;
   an annular supporting insert mounting the sensor carrier body onto said non-rotatable member;
   wherein the sensor carrier body and the supporting insert comprise a releasable lock on one of the carrier body or the supporting insert and seats on the other of the sensor carrier body or the supporting insert releasably locking the sensor carrier body to the supporting insert;
   wherein said releasable lock and seats include:
      a first bayonet joint and complementary first seats for releasably axially locking the sensor carrier body to the supporting insert; and
      a snap-action lock and complementary second seats releasably rotationally locking the sensor carrier body to the supporting insert.

2. A device according to claim 1, wherein the snap-action lock comprises a plurality of flexible tabs with angularly equally spaced axial projections on one of said sensor carrier body or supporting insert and a corresponding plurality of the second seats, the second seats being angularly equally spaced and formed by the other of said supporting insert or sensor carrier body.

3. A device according to claim 2, wherein the snap-action lock comprises at least one projection formed on an elastically flexible tab accessible from the outside and selectively disengaging the projection from the locking second seat formed by the supporting insert to rotationally release the sensor carrier body from the supporting insert.

4. A device according to claim 3, wherein the sensor carrier body forms, near the flexible tab, at least one opening or recess providing access to the flexible tab selectively rotationally releasing the sensor carrier body from the supporting insert.

5. A device according to claim 4, wherein the opening or recess providing access to the flexible tab is a window surrounding the flexible tab on three sides.

6. A device according to claim 1, wherein the bayonet joint and complementary first seats include L-shaped elements axially projecting from one of said sensor body carrier or supporting insert and the complementary first seats include corresponding seats or openings formed by the other of said supporting insert or sensor carrier body.

7. A device according to claim 1, wherein the snap-locking second seats comprise through openings allowing a tool to access the snap-action lock so as to disengage the snap-action lock from the respective openings for rotationally releasing the sensor carrier body from the supporting insert.

8. A device according to claim 1, wherein the supporting insert has, in a part thereof intended to be located at a lower position once assembled on a hub-bearing unit, at least one passage allowing the outflow of water seeped into a space defined between the annular bodies and an axially inner side of the hub-bearing unit.

9. A device according to claim 8, wherein the supporting insert provides a plurality of said passages circumferentially spaced from one another, at least one of which is located in a lower position once a device is assembled on a hub-bearing unit.

10. A device according to claim 1, wherein said sensor is a sensor chosen from the group consisting of: rotation sensors, linear or angular displacement sensors, temperature sensors, vibration sensors, load sensors.

11. A device according to claim 10, wherein:
   the sensor is a rotation sensor for detecting relative rotation between a rotatable member and a non-rotatable member of a bearing unit, and the annular supporting insert is arranged for mounting the sensor carrier body onto said non-rotatable member with the sensor operatively facing an impulse ring secured to a rotatable member of the bearing unit.

12. A device according to claim 1, wherein the bearing unit is a hub-bearing unit for a motor vehicle wheel.

* * * * *